United States Patent
Ding et al.

(10) Patent No.: US 12,473,700 B2
(45) Date of Patent: Nov. 18, 2025

(54) CABLE-CLIMBING ROBOT

(71) Applicant: SHENZHEN INSTITUTE OF ARTIFICIAL INTELLIGENCE AND ROBOTICS FOR SOCIETY, Guangdong (CN)

(72) Inventors: Ning Ding, Guangdong (CN); Zhenliang Zheng, Guangdong (CN); Junlin Song, Guangdong (CN)

(73) Assignee: SHENZHEN INSTITUTE OF ARTIFICIAL INTELLIGENCE AND ROBOTICS FOR SOCIETY, Guangdong (CN)

( * ) Notice: Subject to any disclaimer, the term of this patent is extended or adjusted under 35 U.S.C. 154(b) by 588 days.

(21) Appl. No.: 17/923,614

(22) PCT Filed: Apr. 23, 2021

(86) PCT No.: PCT/CN2021/089170
§ 371 (c)(1),
(2) Date: Nov. 7, 2022

(87) PCT Pub. No.: WO2022/001319
PCT Pub. Date: Jan. 6, 2022

(65) Prior Publication Data
US 2023/0183929 A1    Jun. 15, 2023

(30) Foreign Application Priority Data
Jul. 1, 2020    (CN) .......................... 202010625121.0

(51) Int. Cl.
*B62K 25/30*    (2006.01)
*B62D 57/04*    (2006.01)
(Continued)

(52) U.S. Cl.
CPC .......... *E01D 19/106* (2013.01); *B62D 57/04* (2013.01)

(58) Field of Classification Search
CPC .... B62D 57/04; B62D 57/024; B62D 55/075; E01D 19/10; E01D 19/106; E01D 22/00; E01D 19/16
(Continued)

(56) References Cited

FOREIGN PATENT DOCUMENTS

| CN | 105835640 A | 8/2016 |
|---|---|---|
| CN | 206204783 U | 5/2017 |

(Continued)

OTHER PUBLICATIONS

International Search Report for PCT/CN2021/089170 mailed Jul. 22, 2021, ISA/CN.

(Continued)

*Primary Examiner* — Valentin Neacsu
*Assistant Examiner* — Nabin Kumar Sharma
(74) *Attorney, Agent, or Firm* — Yue (Robert) Xu; Apex Attorneys at Law, LLP

(57) ABSTRACT

A cable climbing robot includes a climbing front body and a detection body. The climbing front body includes a front body rack, duct propellers, a front body clasping unit and a front body control module, the duct propellers are mounted on the outer side of the front body rack; the front body clasping unit includes a front body clasping electric motor, a front body clasping transmission component and a front body clasping member; the front body clasping electric motor is fixedly mounted on the front body rack, and the front body clasping electric motor drives the front body clasping member via the front body clasping transmission component; the front body control module is mounted on the (Continued)

front body rack, and the front body control module is electrically connected to the duct propellers and the clasping electric motor.

11 Claims, 7 Drawing Sheets

(51) Int. Cl.
*B62K 3/02* (2006.01)
*B62K 25/04* (2006.01)
*E01D 19/10* (2006.01)

(58) Field of Classification Search
USPC .................................. 180/7.4; 901/44, 1
See application file for complete search history.

(56) References Cited

FOREIGN PATENT DOCUMENTS

| | | |
|---|---|---|
| CN | 108454723 A | 8/2018 |
| CN | 108528558 A | 9/2018 |
| CN | 207987730 U | 10/2018 |
| CN | 108789353 A | 11/2018 |
| CN | 108909865 A | 11/2018 |
| CN | 110194228 A | 9/2019 |
| CN | 110952443 A | 4/2020 |
| CN | 111622100 A | 9/2020 |
| CN | 111622101 A | 9/2020 |
| CN | 212771927 U | 3/2021 |
| IN | 212771928 U | 3/2021 |

OTHER PUBLICATIONS

Chinese first office action issued on May 29, 2024 for the Chinese priority application No. 202010625121.0.

CABLE-CLIMBING ROBOT

This application is the national phase of International Application No. PCT/CN2021/089170, titled "CABLE-CLIMBING ROBOT", filed on Apr. 23, 2021, which claims the benefit of priority to Chinese Patent Application No. 202010625121.0, titled "CABLE-CLIMBING ROBOT", filed on Jul. 1, 2020 with the Chinese Patent Office, the entire disclosures thereof are incorporated herein by reference.

FIELD

The present disclosure relates to the technical field of cable inspection equipment, and in particular to a cable-climbing robot.

BACKGROUND

In modern bridge construction, a bridge deck is hoisted by cables for a cable-stayed bridge or a suspension bridge. The cables are used to bear the weight of the bridge deck, and are important load-bearing components of the bridge. Since the cables bear the weight of the bridge for a long period of time and are subjected to complicated tests of the nature environment such as wind, rain, and sunlight, the cables are prone to surface corrosion and internal steel-wire breakage in usage. Therefore, according to the relevant requirements in the "Code for Maintenance of Roads, Bridges and Culverts", technicians need to regularly inspect the bridges, especially the cables of the bridges in order to ensure the safety and normal use of the bridges.

With the development of robot technology, there are some cable-climbing robots that take a cable as a climbed object. These cable-climbing robots carry inspection equipment for the cable, and apply a pressure to the cable to be attached to the cable by using climbing mechanisms such as climbing wheels or crawler belts, to realize climbing up and down along the cable, and the cable being climbed is inspected while the cable-climbing robots are climbing. However, the cable is used as a climbed object in the solution of climbing along the cable and inspecting, which easily causes damages to the cable; in addition, since the climbing speed is low, the inspection efficiency of the cable-climbing robots to the cable is seriously influenced.

SUMMARY

A cable-climbing robot is provided according to embodiments of the present disclosure, to provide a new cable-climbing robot, which can reduce the number of times of attachment and an attachment pressure on the surface of a cable during the climbing, thereby reducing the damage of the cable-climbing robot to the surface of the cable.

The cable-climbing robot according to the present disclosure includes a climbing precursor (100) and an inspection body (200);

where the climbing precursor (100) includes a precursor rack (110), ducted thrusters (120), a precursor clasping unit (130), and a precursor control module (140);
the ducted thrusters (120) are mounted at an outer side of the precursor rack (110) in a manner of surrounding the precursor rack (110);
the precursor clasping unit (130) includes a precursor clasping motor (131), a precursor clasping transmission component (132), and a precursor clasping member (133), where the precursor clasping motor (131) is fixedly mounted on the precursor rack (110), and the precursor clasping motor (131) is configured to drive the precursor clasping member (133) through the precursor clasping transmission component (132), to allow the precursor clasping member (133) to clasp a cable (900);
the precursor control module (140) is mounted on the precursor rack (110), and the precursor control module (140) is electrically connected to the ducted thrusters (120) and the precursor clasping motor (131), to control operation of the ducted thrusters (120) and the precursor clasping motor (131); and
where the inspection body (200) includes a body frame (210), a body guide wheel (220), a body clasping unit (230), a body control module (240) and a traction mechanism (250);
the body guide wheel (220) is rotatably mounted on the body frame (210), and is in contact with a surface of the cable (900) in a rollable manner, to guide the body frame (210) to climb along the cable (900);
the body clasping unit (230) includes a body clasping motor, a body clasping transmission component and a body clasping member, the body clasping motor is fixedly mounted on the body frame (210), and the body clasping motor is configured to drive the body clasping member through the body clasping transmission component, to allow the body clasping member to clasp the cable (900);
the traction mechanism (250) includes a traction rope (251) and a winding drive mechanism (252), one end of the traction rope (251) is fixedly connected to the precursor rack (110), and the other end of the traction rope (251) is fixedly connected to the winding drive mechanism (252), the winding drive mechanism (252) is fixedly mounted on the body frame (251) and is configured to wind or release the traction rope (251), to allow the body frame (210) to get close to or away from the precursor rack (110) along the cable (900); and
the body control module (240) is mounted on the body frame (210), and the body control module (240) is electrically connected to the body clasping motor (231) and the winding drive mechanism (252), to control operation of the body clasping motor (231) and the winding drive mechanism (252).

Optionally, the cable-climbing robot further includes steering gears (121), where
a casing of each of the ducted thrusters (120) is fixedly mounted on an output shaft of a corresponding steering gear of the steering gears (121), and each of the steering gears (121) is fixedly mounted at the outer side of the precursor rack (110); and
the precursor control module (140) is electrically connected to the steering gears (121) to control rotation of the output shaft of each of the steering gears (121), to adjust an inclination angle of each of the ducted thrusters (120) relative to the precursor rack (110).

Optionally, the ducted thrusters (120) are provided in an even number, and the even-numbered ducted thrusters are evenly distributed around the precursor rack (110) and are distributed on a same cross-section of the precursor rack (120).

Optionally, the precursor clasping transmission component (132) includes a transmission shaft (1321) and two transmission arms (1322);
the transmission shaft (1321) is rotatably mounted on the precursor rack (110), the transmission shaft (1321) is drivingly connected to an output shaft of the precursor clasping motor (131), and the two transmission arms (1322) are rotatably mounted on the precursor rack (110), where one end of one of the two transmission arms (1322) and one end of the other of the two transmission arms (1322) are drivingly connected to both ends of the transmission shaft (1321) respectively, and the other end of each of the two transmission arms (1322) is rotatably connected to the precursor clasping member (133).

Optionally, each of the both ends of the transmission shaft (1321) is provided with transmission threads (1323), and each of the two transmission arms (1322) is fixedly connected with a transmission worm wheel (1324) engaged with the transmission threads (1323).

Optionally, two precursor clasping units (130) and two body clasping units (230) are provided, the two precursor clasping units (230) are located at an uppermost portion and a lowermost portion of the precursor rack (110) respectively, and are arranged symmetrically with respect to a center of the main body rack (100); the two body clasping units (230) are located at an uppermost portion and a lowermost portion of the body frame (210) respectively, and are arranged symmetrically with respect to a center of the body frame (210).

Optionally, the climbing precursor (100) further includes a precursor guide wheel (150) and a bracket for the precursor guide wheel (151);
the precursor guide wheel (150) is mounted on the precursor rack (110) through the bracket for the precursor guide wheel (151) and is mounted in a climbing direction of the cable-climbing robot, and the precursor guide wheel (150) is in contact with the surface of the cable (900) in a rollable manner, to guide the cable-climbing robot to climb along the cable (900).

Optionally, the bracket for the precursor guide wheel (151) is rotatably mounted on the precursor rack (110), a buffer structure (152) is mounted between the bracket for the precursor guide wheel (151) and a rotatable direction of the precursor rack (110), one end of the buffer structure (152) is fixedly mounted on the bracket for the precursor guide wheel (151), and another end of the buffer structure (152) is fixedly mounted on the precursor rack (110).

Optionally, the cable-climbing robot further includes auxiliary wheels (160) and a bracket for auxiliary wheel brackets (161), where
at least one of the auxiliary wheels (160) are mounted at an inner side of the main body rack (110) through a corresponding auxiliary wheel bracket (161), and is in contact with the cable (900) in a rollable manner during climbing of the cable-climbing robot along the cable (900); and
at least another one of the auxiliary wheels (160) is further mounted at an inner side of the body frame (210) through another corresponding an auxiliary wheel bracket (161), and is in contact with the cable (900) in a rollable manner during the climbing of the cable-climbing robot along the cable (900).

Optionally, the precursor rack (110) includes a left precursor rack (111) and a right precursor rack (112), and the left precursor rack (111) has a same structure as that of the right precursor rack (112); the body frame (210) includes a left body frame (211) and a right body frame (212), and the left body frame (211) has a same structure as that of the right body frame (212).

Optionally, the left precursor rack (111) and/or the right precursor rack (112) further includes a precursor handle (113), and the left body frame (211) and/or the right body frame (212) further includes a body handle (213).

As can be seen from the above technical solutions, the embodiments of the present disclosure have the following advantages.

The cable-climbing robot according to the present disclosure, which adopts a split structure, includes a climbing precursor and an inspection body. Instead of taking the cable as a main load-bearing object during the climbing of the climbing precursor as in the conventional art, according to the present disclosure, the ducted thrusters serve as the climbing power of the climbing precursor. In a case that a thrust force in a climbing direction generated by the ducted thrusters is greater than the gravity of the load of the climbing precursor itself, the climbing precursor climbs upward; in a case that the thrust force in the climbing direction generated by the ducted thrusters is equal to the gravity of the load of the climbing precursor itself, the climbing precursor is suspended; and in a case that the thrust force in the climbing direction generated by the ducted thrusters is less than the gravity of the load of the climbing precursor itself, the climbing precursor descends. The inspection body is connected to the climbing precursor through the traction rope of the traction mechanism. After the climbing precursor clasps the cable under the action of the precursor clasping unit, the thrust force output of the ducted thrusters may be suspended, and the inspection body may start the traction mechanism to wind the traction rope connected to the climbing precursor, so that the inspection body climbs toward the climbing precursor along the cable, at this time, the inspection equipment carried in the inspection body can inspect the cable. After the inspection body climbs toward the climbing precursor and reaches a preset position, the traction mechanism locks the winding of the traction rope, the body clasping unit of the inspection body is started to clasp the cable, and the inspection body is autonomously fixed on the cable, at this time, the traction mechanism releases the control of the traction rope, the climbing precursor may restart the ducted thrusters, then the climbing precursor releases the precursor clasping unit, and the climbing precursor realizes climbing along the cable, suspension, and fixation again under the action of the thrust force of the ducted thrusters. Then the inspection body winds the traction rope again to be closer to the climbing precursor, inspects the cable, and is fixed on the cable. The above processes are repeated, thus the step-by-step climbing and inspection on the cable are realized. In the technical solutions according to the present disclosure, for the ducted thrusters used in the climbing precursor, the ducted casing protects rotating blades. Therefore, there is no need to worry about the collision between the rotating blades and the cable or other objects when the climbing precursor climbs up and down along the cable. The ducted thrusters have the characteristics of a large thrust force and a clear thrust direction. With the direction and the magnitude of the thrust force the ducted thrusters being accurately set, the collision between the cable-climbing robot and the cable during the climbing can be greatly reduced, which reduces the number of times of attachment to the surface of the cable, thereby reducing the damage of the cable-climbing robot to the surface of the cable. Since the cable-climbing robot according to the present disclosure adopts a split structure, it is not required to consider the load of the inspection body for the climbing of the climbing precursor on the cable, and the climbing precursor can climb rapidly on the cable. The climbing of the inspection body on the cable neither relies on the ducted thrusters of the climbing precursor to provide the thrust force, nor does it rely on the surface friction of the cable to provide power for climbing like traditional wheeled climbing robots, instead, climbing of the inspection body relies on the cooperation of the traction mechanism and the climbing precursor to perform traction to the inspection body. With the split structure adopted by the cable-climbing robot according to the present disclosure, rapid climbing on the cable of the inspection body carrying the inspection equipment of relatively large quality can be realized, and there is no need to worry about the slippage between various wheels of the inspection body and the cable during the climbing.

DETAILED DESCRIPTION OF THE EMBODIMENTS

Figure 1:
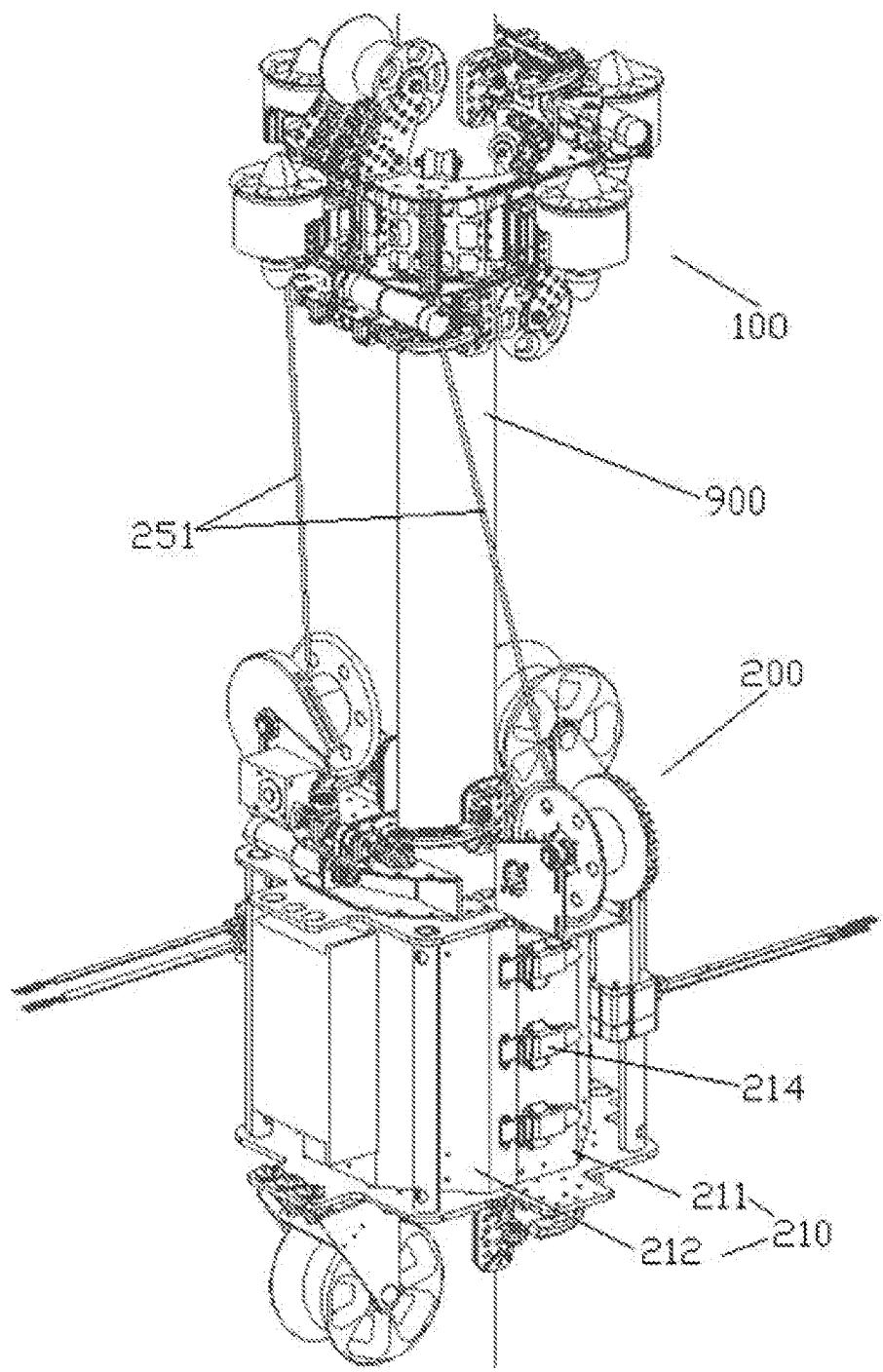
FIG. 1 is a schematic structural view showing a cable-climbing robot climbing on a cable according to an embodiment of the present disclosure.

A cable-climbing robot is provided according to embodiments of the present disclosure, to reduce the number of times of attachment and an attaching pressure on the surface of a cable during the climbing, thereby reducing the damage of the cable-climbing robot to the surface of the cable.

Reference is comprehensively made to FIGS. 1 to 9. A cable-climbing robot according to the embodiments of the present disclosure, which adopts a split structure, includes a climbing precursor and an inspection body which cooperate to realize forward or backward movement along a length direction of the cable 900 and inspection and maintenance of the cable 900. In fact, the cable-climbing robot according to the present disclosure is mainly used for climbing cables of cable-stayed bridges and suspension bridges. The cable-climbing robot includes a climbing precursor 100 and an inspection body 200. The climbing precursor 100 includes a precursor rack 110, ducted thrusters 120, a precursor clasping unit 130 and a precursor control module 140. The multiple ducted thrusters 120 are mounted at an outer side of the precursor rack 110 in a manner of surrounding the precursor rack 110, and the ducted thrusters are mainly employed to provide a thrust force for climbing of the climbing precursor. The precursor clasping unit 130 includes a precursor clasping motor 131, a precursor clasping transmission component 132, and a precursor clasping member 133, where the precursor clasping motor 131 is fixedly mounted on the precursor rack 110, and the precursor clasping motor 131 is configured to drive the precursor clasping member 133 through the precursor clasping transmission component 132, to allow the precursor clasping member 133 to clasp the cable 900. The precursor control module 140 is mounted on the precursor rack 110, and the precursor control module 140 is electrically connected to the ducted thrusters 120 and the precursor clasping motor 131 through wires, to control the magnitude of the thrust force of the ducted thrusters 120 and forward or reverse rotation of the precursor clasping motor 131. The inspection body 200 includes a body frame 210, a body guide wheel 220, a body clasping unit 230, a body control module 240 and a traction mechanism 250. The body guide wheel 220 is rotatably mounted on the body frame 210, and is in contact with a surface of the cable 900 in a rollable manner, to guide the body frame 210 to climb along the cable 900. The body clasping unit 230 includes a body clasping motor, a body clasping transmission component and a body clasping member, where the body clasping motor is fixedly mounted on the body frame 210, and the body clasping motor is configured to drive the body clasping member through the body clasping transmission component, to allow the body clasping member to clasp the cable 900. The traction mechanism 250 includes a traction rope 251 and a winding drive mechanism 252, one end of the traction rope 251 is fixedly connected to the precursor rack 110, and the other end of the traction rope 251 is fixedly connected to the winding drive mechanism 252. The winding drive mechanism 252 is fixedly mounted on the body frame 251 and is configured to wind or release the traction rope 251, to allow the body frame 210 to get close to or away from the precursor rack 110 along the cable 900. The body control module 240 is mounted on the body frame 210, and the body control module 240 is electrically connected to the body clasping motor 231 and the winding drive mechanism 252 through wires, to control the forward or reverse rotation of the body clasping motor 231 and control the winding drive mechanism 252 to wind, lock and release the traction rope. Of course, it is required to provide a battery or a power source in the cable-climbing robot according to the embodiments of the present disclosure, and the climbing precursor and the inspection body each has an independent battery or power source. The battery or power source in the climbing precursor is configured to supply power to the precursor control module 140, the ducted thrusters 120, and the precursor clasping motor 131. The battery or power source in the inspection body is configured to supply power to the carried cable inspection equipment and/or maintenance equipment, the body clasping motor, the winding drive mechanism 252, and the body control module 240. The connection and arrangement between the battery or power source and the electrical equipment may be in various manners, which will not be described herein, as long as the power supply and control of the electrical equipment can be realized.

Figure 2:
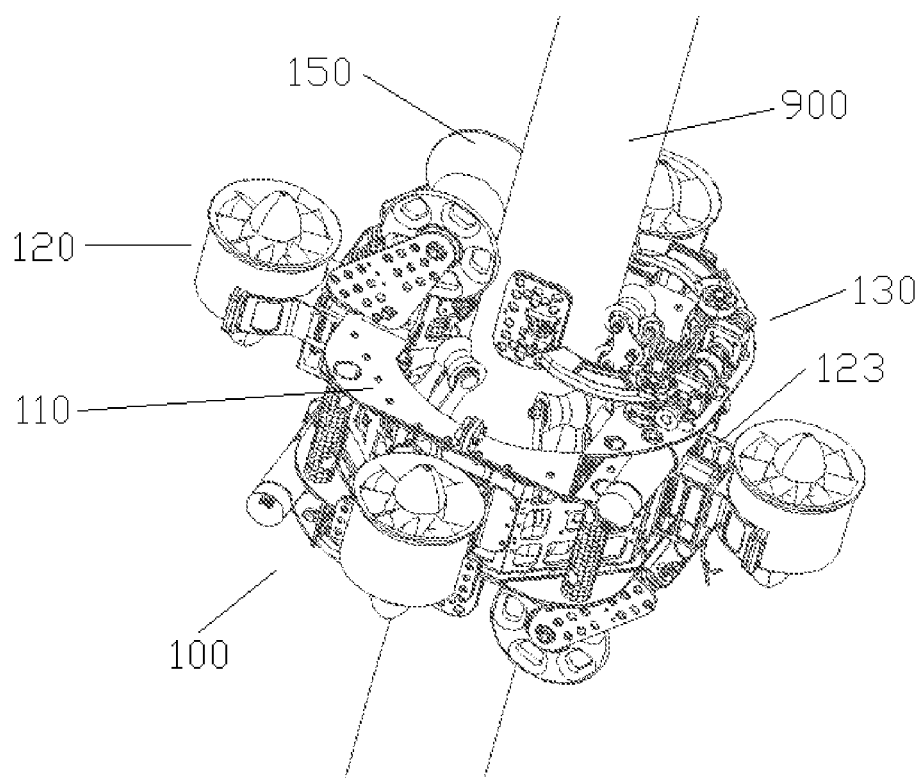
FIG. 2 is a schematic view showing the structure of a climbing precursor of a cable-climbing robot according to an embodiment of the present disclosure.
Figure 3:
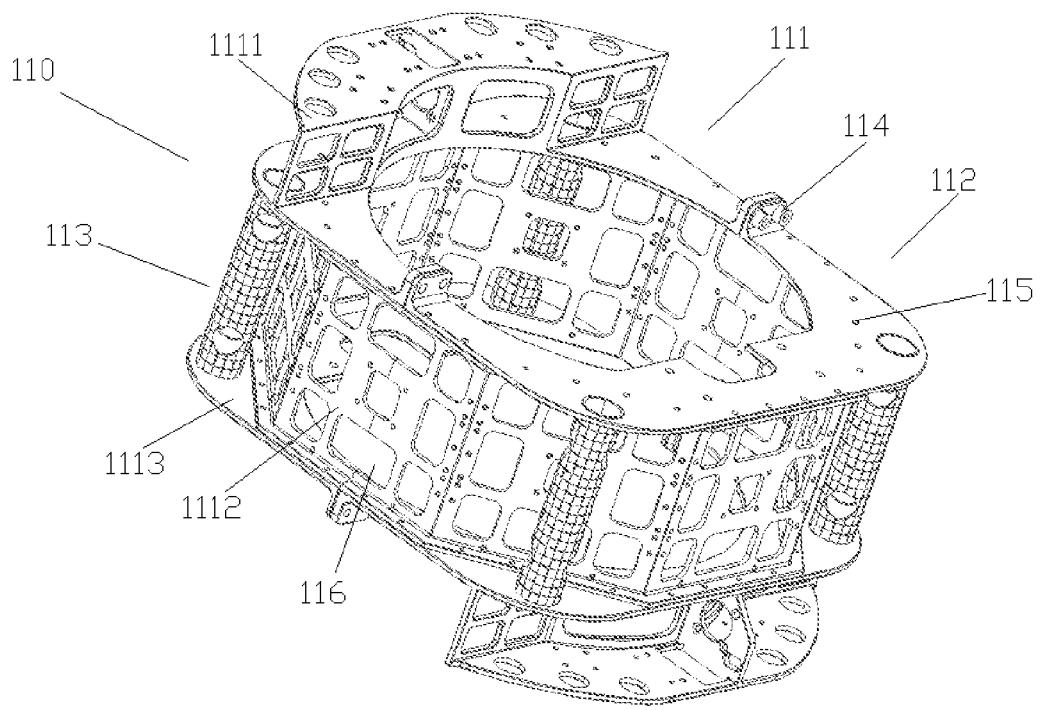
FIG. 3 is a schematic view showing the structure t of a precursor rack of a cable-climbing robot according to an embodiment of the present disclosure.

Reference is made to FIGS. 2 and 3, which show a precursor rack 110 of a climbing precursor 100 of a cable-climbing robot according to an embodiment of the present disclosure. The precursor rack 110 may be divided into two parts, namely a left precursor rack 111 and a right precursor rack 112. Since the shape of a cross section of the cable 900 is approximately circular and the climbing precursor 100 according to the present disclosure is configured to climb along the cable 900, in order to better adapt to the shape characteristics of the cable 900, the left precursor rack 111 and the right precursor rack 112 of the precursor rack 110 cooperate to form an inner channel structure having an approximately circular shape, and the inner channel structure is used for accommodating the cable 900. The left precursor rack 111 has a structure similar to that of the right precursor rack 112, and the left precursor rack 111 and the right precursor rack 112 may be arranged centrosymmetrically, which facilitates the quality balance of the climbing precursor 100 and the arrangement of functional components, and is also beneficial for simplifying the structure and convenient for disassembly and maintenance. A structure for matching and connection is provided between the left precursor rack 111 and the right precursor rack 112 have, which can realize rapid disassembly and assembly. For example, the left precursor rack 111 and the right precursor rack 112 may be connected by spring locks, fastening bolts 114 or the like. The half-and-half type detachable structure of the precursor rack 110 is well adapted to the environment where the cable is mounted, which realizes rapid installation and transfer of the precursor rack 110 among different cables, and thereby facilitating improvements of efficiency of the installation and transfer.

Further, since the left precursor rack 111 and the right precursor rack 112 of the precursor rack 110 have similar structures, only the left precursor rack 111 is further described hereafter as an example. The left precursor rack 111 mainly includes an upper bracket 1111, an auxiliary mounting plate 1112 and a bottom plate 1113. The upper bracket 1111, the auxiliary mounting plate 1112 and the bottom plate 1113 are arranged and fixed in sequence. One end of the auxiliary bracket 1112 is fixed to one side of the upper bracket 1111, and another end of the auxiliary mounting plate 1112 is fixed to one side of the bottom plate 1113. The fixation may be implemented by rivets 115, which is low in cost, firm and light in weight. The upper bracket 1111 is mainly used for mounting the precursor clasping unit 130, an outer side of the auxiliary mounting plate 1112 is used for mounting the ducted thrusters 120, and an inner side of the auxiliary mounting plate 1112 is used for mounting the precursor controller 140.

It is worth noting that the precursor rack 110 may further be provided with a precursor handle 113, to make it convenient for an operator to hold the climbing precursor. Specifically, the precursor handle 113 may be connected between the upper bracket 1111 and the bottom plate 1113. In order to further reduce the weight of the precursor rack 110, reduce the load of the ducted thrusters 120, and thus save energy, the upper bracket 1111, the auxiliary mounting plate 1112 and the bottom plate 1113 of the precursor rack 110 may be hollowed out to a certain extent on condition that the requirements for use are met, for example, holes 116 may be formed in the auxiliary mounting plate 1112.

Figure 9:
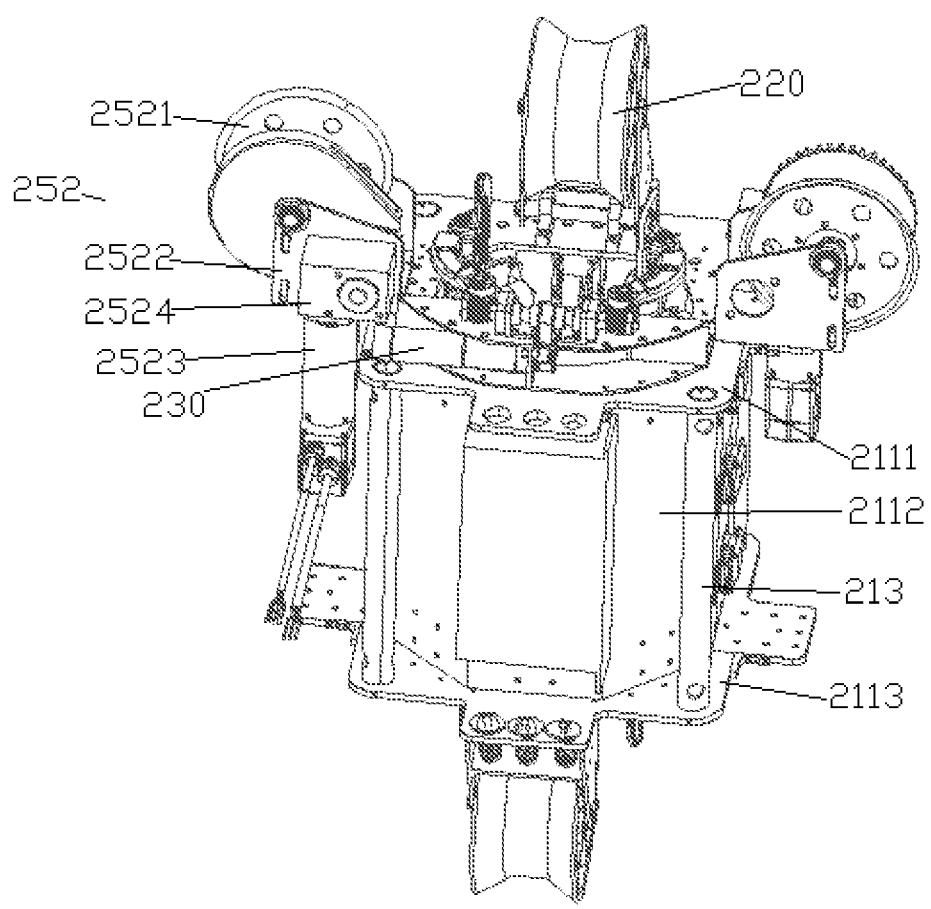
FIG. 9 is a schematic view showing the structure of an inspection body of a cable-climbing robot according to an embodiment of the present disclosure.

Similarly, reference is comprehensively made to FIG. 1 and FIG. 9, which show an embodiment of the body frame 210 of the inspection body 200 of the cable-climbing robot according to the present disclosure. The body frame 210 may be divided into two parts, namely the left body frame 211 and the right body frame 212. Since the shape of the cross section of the cable 900 is approximately circular, and the body frame 210 according to the present disclosure is configured to climb along the cable 900, in order to better adapt to the shape characteristics of the cable 900, the left body frame 211 and the right body frame 212 of the body frame 210 cooperate to form an inner channel structure having an approximately circular shape, and the inner channel structure is used for accommodating the cable 900. The left body frame 211 has a structure similar to that of the right body frame 212, and the left body frame 211 and the right body frame 212 may be symmetrically arranged, which facilitates the quality balance of the inspection body 200 and the arrangement of functional components, and is also beneficial for simplifying the structure and convenient for disassembly and maintenance. A structure for matching and connection is provided between the left body frame 211 and the right body frame 212, which can realize rapid disassembly and assembly. For example, the left body frame 211 and the right body frame 212 may be connected by spring locks 214, fastening bolts or the like. The half-and-half type detachable structure of the inspection body 200 is well adapted to the environment where the cable is mounted, which realizes rapid installation and transfer of the inspection body 200 among different cables, and thereby facilitating improvements of efficiency of the installation and transfer.

Further, since the left body frame 211 and the right body frame 212 of the body frame 210 have similar structures, only the left body frame 211 is further described hereafter as an example. The left body frame 211 mainly includes a top bracket 2111, an auxiliary mounting frame 2112 and a lower plate 2113.

The top bracket 2111, the auxiliary mounting frame 2112 and the lower plate 2113 are arranged and fixed in sequence. One end of the auxiliary mounting frame 2112 is fixed to one side of the top bracket 2111, and another end of the auxiliary mounting frame 2112 is fixed to one side of the lower plate 2113. The fixation may be implemented by rivets, which is low in cost, firm and light in weight. The top bracket 2111 is mainly used for mounting the body clasping unit 230, the body guide wheel 220 and the traction mechanism 250, and an inner side of the auxiliary mounting frame 2112 is used for mounting the body control module 240, inspection equipment, maintenance equipment, auxiliary wheels, etc.

It is worth noting that the body frame 210 may further be provided with a body handle 213, to make it convenient for the operator to hold the inspection body. Specifically, the body handle 213 may be connected between the top bracket 2111 and the lower plate 2113. In order to further reduce the weight of the body frame 210, reduce the traction load of the traction mechanism 250, and thus save energy, the top bracket 2111, the auxiliary mounting frame 2112 and the lower plate 2113 of the body frame 210 may be hollowed out to a certain extent on condition that the requirements for use are met.

Figure 4:
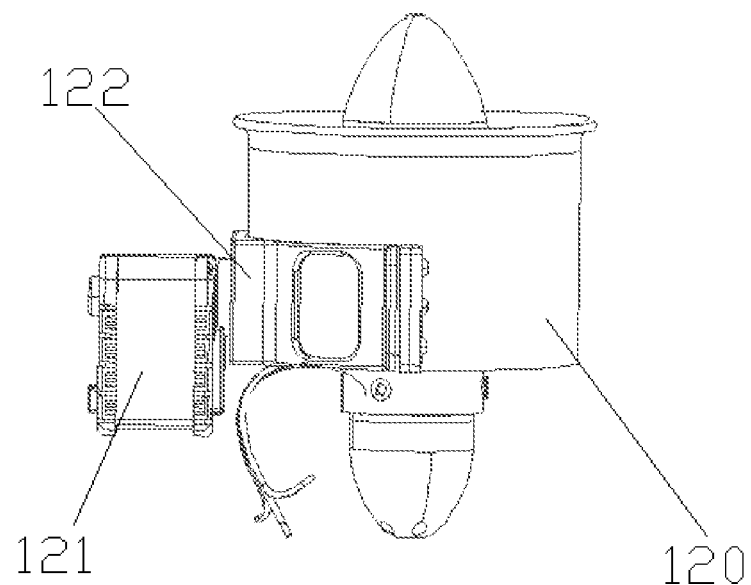
FIG. 4 is a schematic view showing the structure of a ducted thruster of a cable-climbing robot according to an embodiment of the present disclosure.

Reference is made to FIG. 4, which shows an embodiment of a ducted thruster of the climbing precursor of the cable-climbing robot according to the present disclosure. The climbing precursor may further include steering gears 120. The so-called steering gears are position (angle) servo drives, by which an angle can be continuously changed and can be maintained. In the present embodiment, a casing of each of the ducted thrusters 120 may be fixedly mounted on an output shaft of a corresponding steering gear 121 through an adapter bracket 122, and then the steering gear 121 may be fixedly mounted on the outer side of the auxiliary mounting plate 1112. One end of the adapter bracket 122 has a connection structure adapted to the casing of the ducted thruster 120, and another end of the adapter bracket 122 has an adapter port adapted to the output shaft of the steering gear 121, and the adapter bracket 122 is configured to secure the ducted thruster 120 and fixedly connect the ducted thruster 120 to the output shaft of the steering gear 121 as a whole. It should be noted that the steering gears 121 are electrically connected to the precursor control module 140 through wires, and the precursor control module 140 is configured to control the rotation of the output shaft of each of the steering gears 121, so as to adjust an inclination angle of the ducted thruster 120 relative to the precursor rack 110. That is, by controlling a rotation angle of the output shaft of the steering gear 121, a thrust direction of the ducted thruster 120 within a certain angle can be adjusted, that is, the vector adjustment to the thrust direction of the ducted thruster 120 is realized.

Further, in order to ensure that the steering gears 121 are firmly fixed on the auxiliary mounting plate 1112, a steering gear guard 123 may be provided to further fix a position between each of the steering gears 121 and the auxiliary mounting plate 1112, so as to indirectly increase a contact position and a contact area between the steering gear 121 and the auxiliary mounting plate 1112, to make the connection firmer, so that the thrust force generated by the ducted thrusters 120 is transmitted to the precursor rack 110 through the steering gears 121 more directly and quickly.

Specifically, the steering gears 121 and the ducted thrusters 120 mounted on the precursor rack 110 are used in one-to-one correspondence, and both the ducted thrusters 120 and the steering gears 121 are provided in an even number, such as 2 or 4. The even-numbered ducted thrusters 120 bear a more uniform force when climbing up and down carrying the precursor rack 110 along the cable 900. Of course, the more ducted thrusters 120 are provided, the ducted thrusters 120 bear a more stable force when climbing up and down carrying the precursor rack 110 along the cable 900. However, the more ducted thrusters 120 there are, the greater the power consumption of the battery is. In practical implementations, an appropriate number of steering gears 121 and ducted thrusters 120 may be chosen according to actual needs. Further, a quick-release wire connector may be used for the electrical connection between the steering gears 121 and other equipment, and the electrical connection between the ducted thrusters 120 and other equipment, to facilitate expanding the number of the steering gears 121 and the ducted thrusters 120 or replacement of the steering gears 121 and the ducted thrusters 120. Further, the multiple ducted thrusters 120 are on a same cross-section of the precursor rack 110 when being distributed around the precursor rack 110, so that the multiple ducted thrusters 120 arranged in this way bear a more even force during operation, which avoids an overlarge deviation of a center of gravity of the entire climbing precursor which may cause a situation that one or more ducted thrusters are required to generate a thrust force greater than that of the other ducted thrusters to balance a roll-caused shearing force of the cable-climbing robot.

Figure 5:
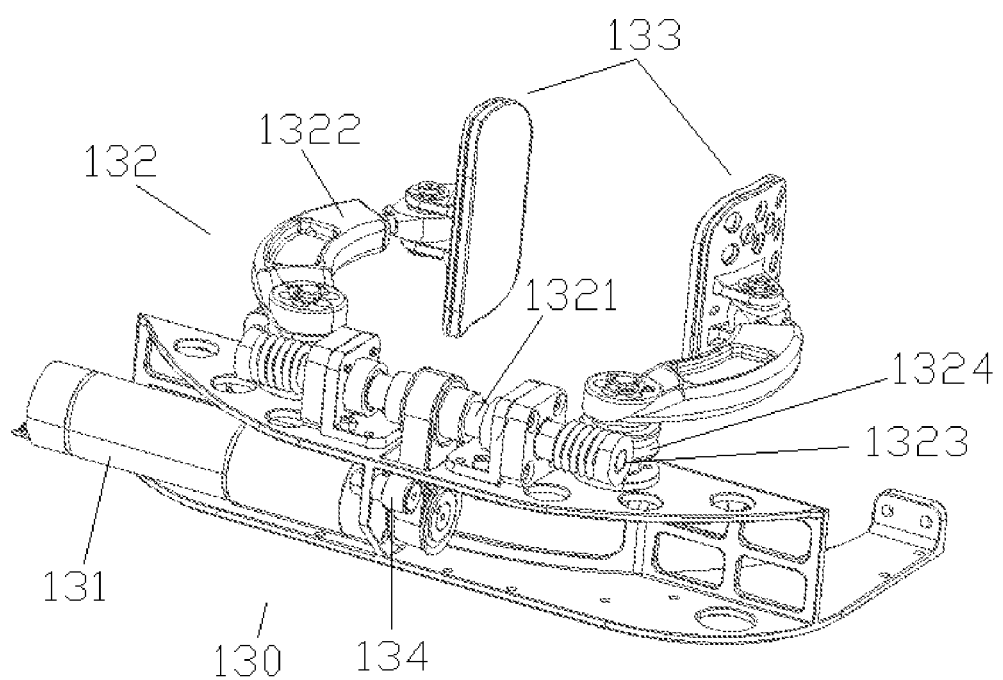
FIG. 5 is a schematic view showing the structure of a precursor clasping unit of a cable-climbing robot according to an embodiment of the present disclosure.

Reference is made to FIG. 5, which shows an embodiment of the precursor clasping unit 130 of the climbing precursor of the cable-climbing robot according to the present disclosure. The precursor clasping unit 130 is adapted to be mounted on the upper bracket 1111 of the precursor rack 110. The precursor clasping unit 130 includes a precursor clasping motor 131, a precursor clasping transmission component 132, and a precursor clasping member 133. An output shaft of the precursor clasping motor 131 is drivingly connected to an input end of the precursor clasping transmission component 132. The output end of the precursor clasping transmission component 132 is connected to the precursor clasping member 133, and the precursor clasping member 133 is a pair of pressing palms, each of which has a surface that matches the outer surface of the cable 900. The pair of pressing palms is configured to clasp the cable tightly, to secure the climbing precursor on the cable without relying on the thrust force of the ducted thrusters 120.

Further, the output shaft of the precursor clasping motor 131 may be connected to an input shaft of a reduction gear, so that the power of the output shaft of the precursor clasping motor 131 may be connected to the precursor clasping transmission component 132 through the output shaft of the reduction gear after deceleration and torque increase being performed by the reduction gear.

Further, the precursor clasping transmission component 132 includes a transmission shaft 1321 and two transmission arms 1322, where the transmission shaft 1321 is rotatably mounted on the precursor rack 110, for example, fixedly mounted on the upper bracket 1111 through multiple bearing seats. The transmission shaft 1321 is drivingly connected to the output shaft of the precursor clasping motor 131, for example, the transmission shaft 1321 is connected to the output shaft of the precursor clasping motor 131 through a power transmission component such as a gear set, a synchronous belt or the like. In a case that the transmission shaft 1321 is connected to the output shaft of the precursor clasping motor 131 through the synchronous belt, a tensioning pulley 134 may be further mounted in a movement path of the synchronous belt. The tensioning pulley 134 is rotatably mounted on the upper bracket 1111, and in contact with the synchronous belt in a rotatable and pressing manner, so that the synchronous belt is deformed to a certain extent, thus the transmission shaft 1321 and the output shaft of the precursor clasping motor 131 are connected under a greater attaching force, which reduce the slippage. The two transmission arms 1322 are rotatably mounted on the precursor rack 110, one end of one of the two transmission arms 1322 and one end of the other of the two transmission arms 1322 are drivingly connected to both ends of the transmission shaft 1321, respectively. For example, the transmission arms 1322 are rotatably mounted on the upper bracket 1111 through a shaft, and the two transmission arms 1322 are mounted on the upper bracket 1111 at positions in close proximity to the two ends of the transmission shaft 1321 respectively, so that the power of the transmission shaft 1321 can be transmitted to the two transmission arms, to realize movement cooperation for opening or closing of the two transmission arms. Specifically, both ends of the transmission shaft 1321 are provided with transmission threads 1323, and a portion of each of the transmission arms 1322 closely adjacent to the transmission shaft 1321 is provided with a transmission worm wheel 1324 for cooperation. The transmission threads 1323 and the transmission worm wheel 1324 form a worm gear transmission structure. The other end of each of the transmission arms 1322 is rotatably connected to the precursor clasping member 133, for example, the precursor clasping member 133 is connected to the transmission arms 1322 through a rod end bearing.

It is worth noting that the precursor clasping unit 130 is used for clasping and securing of the cable 900. It can be known from the above description of the precursor rack 110 that the cable 900 is located in the inner channel structure defined by the left precursor rack 111 and the right precursor rack 112, hence the transmission arms 1322 of the precursor clasping unit 130 should be arranged on the upper bracket 1111 facing the cable 900 as shown in FIG. 2, with the precursor clasping member 133 overhung at the other ends of the transmission arms 1322 being located at two sides of the cable 900. A side of the precursor clasping member 133 for clasping the cable 900 faces the cable 900, and the precursor clasping member 133 has a shape that fits the outline of the outer surface of the cable 900, so that the cable 900 is clasped and secured by the precursor clasping member 133 under a closing action of the transmission arms 1322.

Further, multiple precursor clasping units 130 may be mounted on the precursor rack 110, to realize clasping of the cable 900 at multiple positions, which increase the stability of the climbing precursor 100 attaching to the surface of the cable 900. Specifically, in the precursor rack including the left precursor rack 111 and the right precursor rack 112, since the left precursor rack 111 and the right precursor rack 112 are centrally symmetric, one precursor clasping unit may be mounted on respective upper bracket of each of the left precursor rack 111 and the right precursor rack 112, so that the two precursor clasping units 130 are located at an uppermost portion and a lowermost portion of the precursor rack 110 respectively, and are arranged symmetrically with respect to a center of the precursor rack 110.

Similarly, reference is comprehensively made to FIG. 1 and FIG. 9, which show an embodiment of the body clasping unit 230 on the inspection body of the cable-climbing robot according to the present disclosure. The body clasping unit 230 is adaptedly mounted on the top bracket 2111 of the body frame 210. The body clasping unit 230 includes a body clasping motor, a body clasping transmission component, and a body clasping member. An output shaft of the body clasping motor is drivingly connected to an input end of the body clasping transmission component, and an output end of the body clasping transmission component is connected to the body clasping member, and the body clasping member is a pair of pressing palms, each of which has a surface that matches the outer surface of the cable 900. The pair of pressing palms is configured to clasp the cable tightly to secure the inspection body 200 on the cable 900 without relying on a pulling force of the traction mechanism 250.

It can be understood that the body clasping unit 230 has a specific structure similar to that of the aforementioned precursor clasping unit 130, and details are not repeated here.

Figure 6:
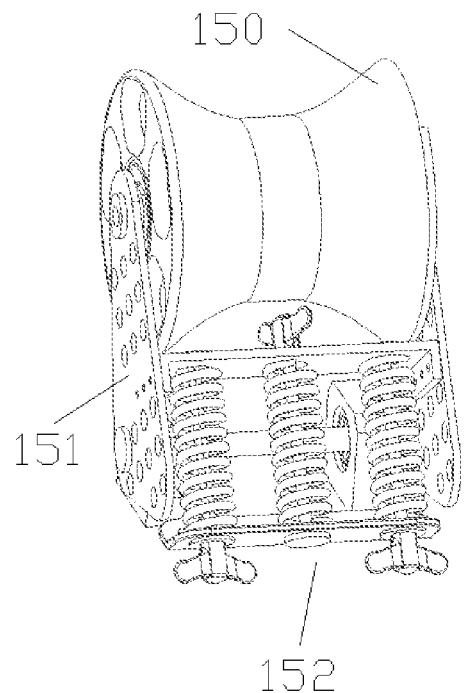
FIG. 6 is a schematic view showing the structure of a precursor guide wheel of a cable-climbing robot according to an embodiment of the present disclosure.

Reference is made to FIG. 6, which illustrates an embodiment of the precursor guide wheel of the climbing precursor of the cable-climbing robot according to the present disclosure. The climbing precursor 100 further includes a precursor guide wheel 150. The precursor guide wheel 150 is mounted on the precursor rack 110 through a bracket for the precursor guide wheel 151, and the precursor guide wheel 150 is in contact with the surface of the cable 900 in a rollable manner, to guide the climbing precursor 100 to climb along the cable 900 in the length direction of the cable 900. That is, the precursor guide wheel 150 has a function of restricting the climbing direction of the climbing precursor on the cable 900. For example, the precursor guide wheel 150 is a V-shaped wheel. Once the cable 900 is confined to a V-shaped groove by the V-shaped wheel, the movement of the cable-climbing robot in an axial direction of a rotation axis of the V-shaped wheel and a direction of the rotation axis of the V-shaped wheel can be restricted. In this case, if a pair of precursor guide wheels 150 are arranged opposite to each other on the left precursor rack 111 and the right precursor rack 112 respectively, the climbing direction of the cable 900 is multi-directionally limited by the climbing precursor 100, and the climbing precursor has only two degrees of freedom of movement in the length direction of the cable 900. It can be understood that, by arranging the guide wheel 500 on the climbing precursor, the climbing precursor is enabled to climb only in the length direction of the cable 900 under the thrust force of the ducted thrusters 120. Since the precursor guide wheel 150 is in contact with the cable 900 in a rollable manner, in a case that the precursor clasping unit 130 does not clasp and secure the cable 900, even if the thrust angle of the ducted thrusters 120, which is controlled by the steering gears 121, is not accurately accord with the direction of the cable 900, the climbing precursor is still enabled to smoothly move on the cable 900, which reduces the waste of thrust force caused by the inaccurate thrust angle of the ducted thrusters 120 controlled by the steering gears 121.

Further, considering that different cables 900 may have different diameters, and even different portions of the same cable may have different diameters, in order to adapt to the cables 900 with varied diameters, the climbing precursor is required to always has a certain degree of attachment force on the cable, so that the climbing precursor does not sway to a great extent relative to the cable. The technical solution of the climbing precursor according to the present disclosure is as follows. The bracket for the precursor guide wheel 151 is rotatably mounted on the precursor rack 110, and a buffer structure 152 is mounted between the bracket for the precursor guide wheel 151 and a rotatable direction of the precursor rack 110. One end of the buffer structure 152 is fixedly mounted on the bracket for the precursor guide wheel 151, and another end of the buffer structure 152 is fixedly mounted on the precursor rack 110. The buffer structure 152 is configured to allow the precursor guide wheel 150 to be attached to the cable 900 with a certain preset pressure. In a case that the diameter of the cable 900 decreases, the preset pressure of the buffer structure 152 forces the bracket for the precursor guide wheel 151 along with the precursor guide wheel 150 to rotatably adapt to the decreased diameter of the cable 900. In a case that the diameter of the cable 900 increases, the buffer structure 152 forces the bracket for the precursor guide wheel 151 along with the precursor guide wheel 150 to rotatably adapt to the increased diameter.

More specifically, the bracket for the precursor guide wheel 151 is fixedly connected to a shaft, and the shaft is then fixed on the bottom plate 1113 of the precursor rack 110 through a bearing seat. In this case, the bracket for the precursor guide wheel 151 may move, around the shaft, close to or away from the cable 900 in the direction of the cable-climbing robot together with the precursor guide wheel 150. The buffer structure 152 is mounted on a side, away from the cable, of the bracket for the precursor guide wheel. The buffer structure includes a spring, a screw rod, and a wing nut. The screw rod penetrates the spring to fix one end of the spring on the bottom plate 1113, and the other end of the screw rod movably connects the other end of the spring to the bracket for the precursor guide wheel 151 through the wing nut. The compression amount of the spring may be adjusted by adjusting the position of the wing nut on the screw rod, so as to realize adjustment of the predetermined pressure of the precursor guide wheel 150 on the cable 900. Under the same preset pressure of the precursor guide wheel 150 on the cable 900, the diameter of the cable 900 may be set in advance by changing a position where the spring and the bracket for the precursor guide wheel 151 are connected and cooperating with another precursor guide wheel arranged oppositely.

Similarly, reference is made to FIGS. 1 and 9, which illustrate an embodiment of a body guide wheel 220 on the inspection body of the cable-climbing robot according to the present disclosure. The body guide wheel 220 on the inspection body 200 is mounted on the body frame 210 through a bracket for the body guide wheel, and the body guide wheel 220 is in contact with the surface of the cable 900 in a rollable manner, to guide the inspection body 200 to climb along the cable 900 in the length direction of the cable 900. It can be understood that the connection manner between the body guide wheel 220 and the body frame 210 is similar to the connection manner between the precursor guide wheel 150 and the precursor rack 110, which is not repeated here.

Figure 7:
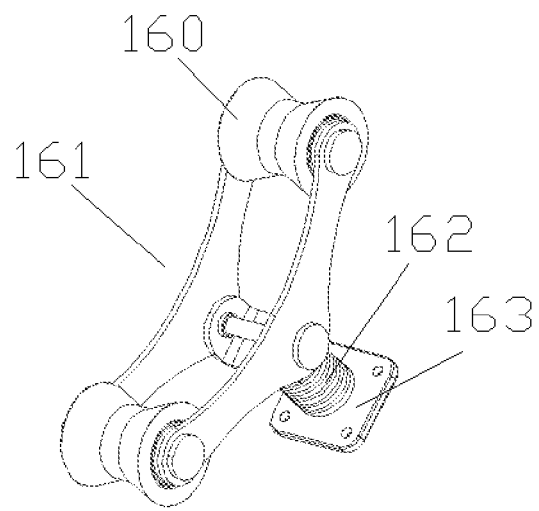
FIG. 7 is a schematic view showing the structure of an auxiliary wheel of a cable-climbing robot according to an embodiment of the present disclosure.

Reference is made to FIG. 7, which illustrates an embodiment of an auxiliary wheel of the cable-climbing robot according to the present disclosure. The climbing precursor 100 and the inspection body 200 of the cable-climbing robot may further include auxiliary wheels 160, and the auxiliary wheels 160 are in contact with the cable 900 in a rollable manner during the climbing of the cable-climbing robot along the cable 900. It can be understood that, since the climbing precursor 100 of the cable-climbing robot needs to carry its own precursor controller, battery, and even some monitor equipment, for example, these equipment is generally mounted on the auxiliary mounting plate 1112 of the precursor rack 110. The carried equipment occupies a certain space, resulting in a long length of the climbing precursor 100 along the length direction of the cable 900. Since the precursor guide wheel 150 has a certain preset attachment force to the cable 900, in order to reduce the thrust load of the ducted thrusters 120, generally, only a pair of precursor guide wheels 150 are provided in the climbing precursor according to the present disclosure. In this case, the climbing precursor 100 may collide with the cable 900 at portions relatively away from the precursor guide wheel 150, and the collision between the climbing precursor 100 and the cable 900 may damage the cable 900 or cause friction with the cable 900, which consumes part of the thrust force of the ducted thrusters. In this case, the auxiliary wheels 160 are required to be mounted at these portions, so that the sliding friction between the climbing precursor 100 and the cable 900 is converted to rolling friction, which greatly reduces the counteraction to the thrust force of the ducted thrusters, thus facilitating improvement the endurance of the climbing precursor 100.

Similarly, since the inspection body 200 of the cable-climbing robot needs to carry its own body control module, battery, inspection equipment and/or maintenance equipment, for example, the equipment is generally mounted in the auxiliary mounting frame 2112 of the body frame 210. The carried equipment occupies a certain space, resulting in a relatively long length of the inspection body 200 in the length direction of the cable 900. The body guide wheel 220 also has a certain preset attachment force to the cable 900. In order to reduce the traction load of the traction mechanism 250, generally, only a pair of body guide wheels 220 is provided in the inspection body according to the present disclosure. In this case, the inspection body 200 may collide with the cable 900 at portions relatively away from the body guide wheel 220. The collision between the inspection body 200 and the cable 900 may damage the cable 900 or generate friction with the cable 900, which consumes part of the traction force of the traction mechanism 250. In this case, the auxiliary wheels 160 are required to be mounted at these portions, so that the sliding friction between the inspection body 200 and the cable 900 is converted to rolling friction, which greatly reduces the counteraction to the traction force of the traction mechanism 250, thus facilitating improvement of the endurance of the inspection body 200.

The auxiliary wheel 160 may be a small V-shaped wheel, and the auxiliary wheel 160 is mounted by the inner channel structure inside the precursor rack 110 via an auxiliary wheel bracket 161. In another embodiment, multiple auxiliary wheels 160 may be mounted on the auxiliary wheel bracket 161. In another embodiment, the auxiliary wheel bracket 161 is rotatably connected to an inner side of the precursor rack 110, and the auxiliary wheel bracket 161 and the precursor rack 110 are elastically fixed, for example, fixedly connected through elastic structures such as springs or spring sheets. The auxiliary wheel bracket which is rotatable and is elastic to a certain extent enables the auxiliary wheels 160 to have the ability to buffer the impact of the cable 900 on the climbing precursor, and have the ability to adapt to the diameter change of the cable 900, which allows the climbing precursor to climb along the cable 900 more smoothly.

Similarly, an auxiliary wheel 160 is mounted by the inner channel structure inside the body frame 210 through an auxiliary wheel bracket 161. In another embodiment, multiple auxiliary wheels 160 may be mounted on the auxiliary wheel bracket 161. In another embodiment, the auxiliary wheel 161 bracket is rotatably connected to an inner side of the body frame 210, and the auxiliary wheel bracket 161 and the precursor rack 110 are elastically fixed, for example, fixedly connected by elastic structures such as springs or spring sheets. The auxiliary wheel bracket 161 which is rotatable and is elastic to a certain extent enables the auxiliary wheels 160 to have the ability to buffer the impact of the cable 900 on the inspection body, and have the ability to adapt to the diameter change of the cable 900, which allows the inspection body to climb along the cable 900 more smoothly.

Figure 8:
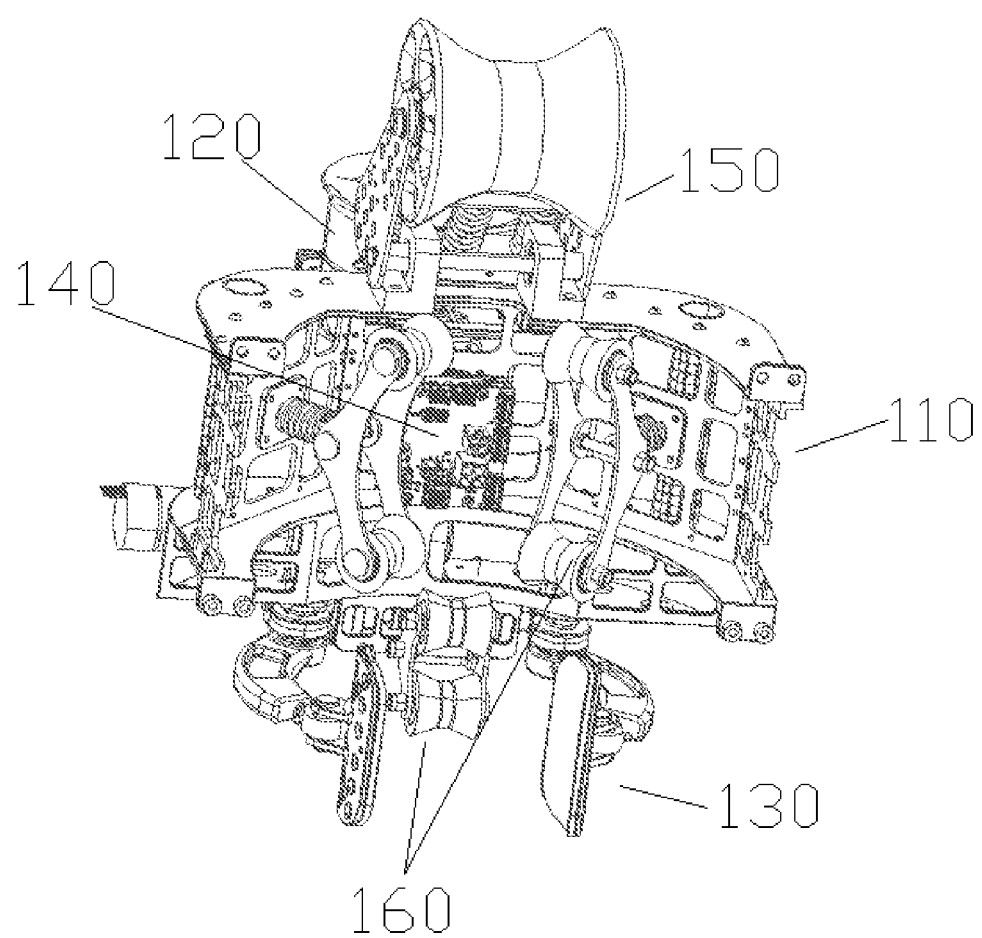
FIG. 8 is a schematic view showing partial structure of a climbing precursor of a cable-climbing robot according to an embodiment of the present disclosure.

Reference is made to FIG. 8. It should be noted that in the embodiments of the present disclosure, the left precursor rack 111 and the right precursor rack 112 of the precursor rack 110 may have the same structure, so as to facilitate the on-site assembly with the cable 900, because it is not necessary to distinguish the left precursor rack 111 and the right precursor rack 112, which is also more convenient and quicker in maintenance and parts replacement. Each left precursor rack 111 or right precursor rack 112 is mounted with assemblies such as the ducted thrusters 120, the steering gears 121, the precursor clasping unit 130, the precursor control module 140, the precursor guide wheel 150, the auxiliary wheel 160, and the battery. It can be understood that the precursor clasping member 133 of the precursor clasping unit 130 is located at two sides of the inner channel structure of the precursor rack 110, if the left precursor rack 111 and the right precursor rack 112 are symmetrically arranged when matching each other to be mounted to the cable 900, interference occurs between the precursor clasping units 130. That is, the precursor clasping unit of the left precursor rack 111 and the precursor clasping unit of the right precursor rack 112 are in the same position in space, and matching and mounting cannot be realized. Therefore, in the present disclosure, matching and mounting of the left rack 101 and the right rack 102 are realized in a centrosymmetric manner. In this case, it is only required to adjust the steering gears 121, to make the directions of the thrust forces of the ducted thrusters 120 are consistent, as shown in FIG. 2. It is worth noting that a pair of precursor guide wheels 150 according to the present embodiment may be separately arranged at an uppermost portion and a lowermost portion of the cable-climbing robot. In this case, the precursor guide wheel 150 needs to cooperate with an auxiliary wheel 160 which is located in the left (right) precursor rack of the opposite side of the precursor guide wheel 150, to realize the restriction of the freedom of movement of the climbing precursor, so that the climbing precursor has only a freedom of movement in the length direction of the cable 900, and the precursor clasping unit 130 can accurately clasp the cable 900.

Similarly, it should be noted that the left body frame 211 and the right body frame 212 of the body frame 210 in the embodiments of the present disclosure may have the same structure, so as to facilitate the on-site assembly with the cable 900, because it is not necessary to distinguish the left body frame 211 with the right body frame 212, which is also more convenient and quicker in maintenance and parts replacement. Each left body frame 211 or right body frame 212 is mounted with assemblies such as the traction mechanism 250, the body clasping unit 230, the body control module 240, the body guide wheel 220, the auxiliary wheel 160, the battery, inspection equipment and/or maintenance equipment and the like. It can be understood that the body clasping member of the body clasping unit 230 is located on two sides of the inner channel structure of the body frame 210, if the left body frame 211 and the right body frame 212 are symmetrically arranged when matching each other to be mounted to the cable 900, interference occurs between the body clasping units 230. That is, the body clasping unit of the left body frame 211 and the body clasping unit of the right body frame 212 are in the same position in space, and matching and mounting cannot be realized. Therefore, in the present disclosure, matching and mounting of the body clasping unit of the left body frame 211 and the body clasping unit of the right body frame 212 are realized in a centrosymmetric manner. It is worth noting that it is better to mount the traction mechanism 250 on a side close to the climbing precursor, so as to effectively utilize the length of the traction rope, as shown in FIG. 9. It is worth noting that in a case that the pair of body guide wheels 220 in the embodiment are separately arranged at an uppermost portion and a lowermost portion of the inspection body, the body guide wheel 22 needs to cooperate with an auxiliary wheel 160 which is located in the left (right) body frame of the opposite side of the body guide wheel 220, to realize the restriction of the freedom of movement of the inspection body, so that the inspection body has only a freedom of movement in the length direction of the cable 900, and the body clasping unit 230 can accurately clasp the cable 900.

Reference is made to FIG. 9, which illustrates an embodiment of the traction mechanism of the cable-climbing robot according to the present disclosure. The traction mechanism 250 includes a traction rope 251 and a winding drive mechanism 252. The winding drive mechanism 252 includes a winding wheel 2521, a traction bracket 2522, and a traction motor 2523. The winding wheel 2521 is rotatably mounted on the traction bracket 2522, the traction motor 2523 is fixedly mounted on the traction bracket 2522, and a power output shaft of the traction motor 2523 is drivingly connected to the winding wheel 2521, so that the winding wheel 2521 can be driven by the traction motor 2523. In order to drive the winding wheel 2521 with a greater torque, the output shaft of the traction motor 2523 may be connected to an input shaft of a speed reducer 2524 first, and the output shaft of the speed reducer 2524 is drivingly connected to the winding wheel 2521 after the deceleration and torque increase of the speed reducer 2524. The traction motor 2523 is electrically connected to the body control module 240, so that the body control module 240 can control the steering and rotational speed of the traction motor 2523. One end of the traction rope 251 is fixed by the winding wheel 2521, and the other end of the traction rope 251 is fixed to the precursor rack 110 of the climbing precursor 100. After the climbing precursor 100 clasps the cable 900 under the action of the precursor clasping unit 130, the thrust force output of the ducted thrusters 120 may be suspended, and the inspection body 200 may start the traction mechanism 250 to wind the traction rope 251 connected to the climbing precursor 100, that is, start the traction motor 2523 to drive the winding wheel 2521, so that the inspection body 200 climbs along the cable 900 toward the climbing precursor 100. At this time, the inspection equipment carried in the inspection body 200 may inspect the cable 900, and if the inspection body 200 carries maintenance equipment, maintenance of the cable 900 can be performed. When the inspection body 200 climbs toward the climbing precursor and get to a preset position of the cable 900, the traction mechanism 250 locks the winding of the traction rope 251, that is, the traction motor 2523 does not rotate, the body clasping unit 230 of the inspection body 200 is started to clasp the cable 900, and the inspection body 200 is autonomously secured on the cable 900. In this case, the traction mechanism 250 releases the control of the traction rope 251, that is, the body control module 240 does not control the traction motor 2523, so that the traction motor 2523 can be idling, which facilitates release, along with the climbing precursor 100, of the traction rope 251 wound up in the winding wheel 2521. The climbing precursor 100 can restart the ducted thrusters 120, then the climbing precursor 100 releases the precursor clasping unit 130, and the climbing precursor 100, under the thrust force of the ducted thrusters 120, moves along the cable 900 again. The climbing precursor 100 is suspended after reaching a preset location, and the climbing precursor 100 restarts the precursor clasping unit 130 to secure the climbing precursor 100 on the cable 900. Then the inspection body 200 winds the traction rope 251 again to be closer to the climbing precursor 100, inspects and maintains the cable 900, and then is secured to the cable through the body clasping unit 230 after reaching a preset location. The above processes are repeated, thus the step-by-step climbing, inspection and maintenance of the cable-climbing robot on the cable are realized.

An embodiment of a process that the cable-climbing robot according to the present disclosure is required to be dropped from the cable for recovery is as follows. The climbing precursor is secured on the cable through the precursor clasping unit, the inspection body loosens the clasping and securing of the body clasping unit to the cable, and the inspection body drives the traction motor to rotate reversely to release the traction rope accommodated in the winding wheel, and the inspection body is slowly released to a preset position. That is, when the traction motor releases the traction rope, the inspection body slowly descends along the cable under the action of its own gravity until reaching the preset position, start the body clasping unit to secure itself at a specific position of the cable, then the climbing precursor starts the ducted thrusters, and release the precursor clasping unit to reduce the thrust force of the ducted thrusters, so that the thrust force is less than the gravity of the climbing precursor, which enables the climbing precursor to slowly descend along the cable. During the descending of the climbing precursor, the traction motor that drives the inspection body winds the traction rope at the same time. After descending to the preset position, the climbing precursor is suspended, the climbing precursor starts the precursor clasping unit to secure to the cable, turns off the ducted thrusters, and then the inspection body releases clasping and securing of the body clasping unit to the cable. Then, the inspection body descends and then the climbing precursor descends in the above manner. The above processes are repeated for many times, the cable-climbing robot descends from a high position of the cable to the preset position, so as to realize the recovery of the cable-climbing robot.

The above contents are described in conjunction with the specific embodiments of the present disclosure, and it cannot be considered that specific implementations of the present disclosure are limited to these embodiments. Variations and substitutions may be made by those of ordinary skill in the technical field of the present disclosure without departing from the concept of the present application, which should be deemed to fall in the protection scope of the present disclosure.

The invention claimed is:

1. A cable-climbing robot, comprising:
 a climbing precursor and an inspection body;
 wherein the climbing precursor comprises a precursor rack, ducted thrusters, a precursor clasping unit, and a precursor control module;
 the ducted thrusters are mounted at an outer side of the precursor rack in a manner of surrounding the precursor rack;
 the precursor clasping unit comprises a precursor clasping motor, a precursor clasping transmission component, and a precursor clasping member, wherein the precursor clasping motor is fixedly mounted on the precursor rack, and the precursor clasping motor is configured to drive the precursor clasping member through the precursor clasping transmission component, to allow the precursor clasping member to clasp a cable;
 the precursor control module is mounted on the precursor rack, and the precursor control module is electrically connected to the ducted thrusters and the precursor clasping motor, to control operation of the ducted thrusters and the precursor clasping motor; and
 wherein the inspection body comprises a body frame, a body guide wheel, a body clasping unit, a body control module and a traction mechanism;
 the body guide wheel is rotatably mounted on the body frame, and is in contact with a surface of the cable in a rollable manner, to guide the body frame to climb along the cable;
 the body clasping unit comprises a body clasping motor, a body clasping transmission component and a body clasping member, the body clasping motor is fixedly mounted on the body frame, and the body clasping motor is configured to drive the body clasping member through the body clasping transmission component, to allow the body clasping member to clasp the cable;
 the traction mechanism comprises a traction rope and a winding drive mechanism, one end of the traction rope is fixedly connected to the precursor rack, and the other end of the traction rope is fixedly connected to the winding drive mechanism, the winding drive mechanism is fixedly mounted on the body frame and is configured to wind or release the traction rope, to allow the body frame to get close to or away from the precursor rack along the cable; and
 the body control module is mounted on the body frame, and the body control module is electrically connected to the body clasping motor and the winding drive mechanism, to control operation of the body clasping motor and the winding drive mechanism.

2. The cable-climbing robot according to claim 1, further comprising steering gears, wherein
 a casing of each of the ducted thrusters is fixedly mounted on an output shaft of a corresponding steering gear of the steering gears, and each of the steering gears is fixedly mounted at the outer side of the precursor rack; and
 the precursor control module is electrically connected to the steering gears to control rotation of the output shaft of each of the steering gears, to adjust an inclination angle of each of the ducted thrusters relative to the precursor rack.

3. The cable-climbing robot according to claim 2, wherein the ducted thrusters are provided in an even number, and the even-numbered ducted thrusters are evenly distributed around the precursor rack and are distributed on a same cross-section of the precursor rack.

4. The cable-climbing robot according to claim 1, wherein the precursor clasping transmission component comprises a transmission shaft and two transmission arms;
 the transmission shaft is rotatably mounted on the precursor rack, the transmission shaft is drivingly connected to an output shaft of the precursor clasping motor, and the two transmission arms are rotatably mounted on the precursor rack, wherein one end of one of the two transmission arms and one end of the other of the two transmission arms are drivingly connected to both ends of the transmission shaft respectively, and the other end of each of the two transmission arms is rotatably connected to the precursor clasping member.

5. The cable-climbing robot according to claim 4, wherein each of the both ends of the transmission shaft is provided with transmission threads, and each of the two transmission arms is fixedly connected with a transmission worm wheel engaged with the transmission threads.

6. The cable-climbing robot according to claim 5, wherein two precursor clasping units and two body clasping units are provided, the two precursor clasping units are located at an uppermost portion and a lowermost portion of the precursor rack respectively, and are arranged symmetrically with respect to a center of the precursor rack; the two body clasping units are located at an uppermost portion and a lowermost portion of the body frame respectively, and are arranged symmetrically with respect to a center of the body frame.

7. The cable-climbing robot according to claim 1, wherein the climbing precursor further comprises a precursor guide wheel and a bracket for the precursor guide wheel;
 the precursor guide wheel is mounted on the precursor rack through the bracket for the precursor guide wheel and is mounted in a climbing direction of the cable-climbing robot, and the precursor guide wheel is in contact with the surface of the cable in a rollable manner, to guide the cable-climbing robot to climb along the cable.

8. The cable-climbing robot according to claim 7, wherein the bracket for the precursor guide wheel is rotatably mounted on the precursor rack, a buffer structure is mounted between the bracket for the precursor guide wheel and a rotatable direction of the precursor rack, one end of the buffer structure is fixedly mounted on the bracket for the precursor guide wheel, and another end of the buffer structure is fixedly mounted on the precursor rack.

9. The cable-climbing robot according to claim 1, further comprising auxiliary wheels and auxiliary wheel brackets, wherein
 at least one of the auxiliary wheels is mounted at an inner side of the precursor rack through a corresponding auxiliary wheel bracket of the auxiliary wheel brackets, and is in contact with the cable in a rollable manner during climbing of the cable-climbing robot along the cable; and at least another one of the auxiliary wheels is further mounted at an inner side of the body frame through another corresponding auxiliary wheel bracket of the auxiliary wheel brackets, and is in contact with the cable in a rollable manner during the climbing of the cable-climbing robot along the cable.

10. The cable-climbing robot according to claim 1, wherein the precursor rack comprises a left precursor rack and a right precursor rack, and the left precursor rack has a same structure as that of the right precursor rack; the body frame comprises a left body frame and a right body frame, and the left body frame has a same structure as that of the right body frame.

11. The cable-climbing robot according to claim 10, wherein the left precursor rack and/or the right precursor rack further comprises a precursor handle, and the left body frame and/or the right body frame further comprises a body handle.

* * * * *